(12) United States Patent
Netzel

(10) Patent No.: US 11,588,281 B1
(45) Date of Patent: Feb. 21, 2023

(54) TRAILER ILLUMINATION ASSEMBLY

(71) Applicant: James Netzel, Kerrick, MN (US)

(72) Inventor: James Netzel, Kerrick, MN (US)

( * ) Notice: Subject to any disclaimer, the term of this patent is extended or adjusted under 35 U.S.C. 154(b) by 0 days.

(21) Appl. No.: 17/742,981

(22) Filed: May 12, 2022

(51) Int. Cl.
  *H01R 13/717* (2006.01)
  *H01R 13/688* (2011.01)
  *B60Q 1/26* (2006.01)

(52) U.S. Cl.
  CPC ......... *H01R 13/717* (2013.01); *B60Q 1/2615* (2013.01); *H01R 13/688* (2013.01)

(58) Field of Classification Search
  CPC ... H01R 13/688; H01R 13/717; B60Q 1/2615
  See application file for complete search history.

(56) References Cited

U.S. PATENT DOCUMENTS

| | | |
|---|---|---|
| 4,368,455 A | 1/1983 | Menard |
| 4,751,431 A | 6/1988 | Ducote |
| 4,846,697 A | 7/1989 | Rodgers |
| 7,033,209 B2 | 4/2006 | Swiatek |
| 8,120,199 B2 | 2/2012 | Inskeep |
| 2006/0028327 A1* | 2/2006 | Amis ...................... B60Q 11/00 340/468 |
| 2015/0011098 A1* | 1/2015 | Rotenberg ........... H01R 13/717 439/35 |

FOREIGN PATENT DOCUMENTS

WO  WO0222395  3/2002

* cited by examiner

Primary Examiner — Thomas M Sember

(57) ABSTRACT

A trailer illumination assembly includes a trailer that has a plurality of running lights disposed on the trailer. The trailer includes a power source is positioned in the trailer and a female light plug which can be electrically coupled to a male light plug on a towing vehicle. The female light plug is in communication with the plurality of running light. An adapter plug is pluggable into the female light plug when the female light plug is not electrically coupled to the male light plug on the towing vehicle. Additionally, the adapter plug places the power source on the trailer in electrical communication with the plurality of running lights on the trailer. In this way the running lights on the trailer can be powered by the power source on the trailer.

7 Claims, 5 Drawing Sheets

TRAILER ILLUMINATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to illumination device and more particularly pertains to a new illumination device for facilitating running lights on a trailer to be powered without being electrically coupled to a tow vehicle. The device includes an adapter plug that can be plugged into a power contact and a running light contact in a female light plug on the trailer. The device includes a fuse that is plugged into the adapter plug to complete a circuit between the power contact and the running light contact. In this way the running lights on the trailer can be powered by a battery on the trailer.

(2) Description of Related Art Including Information Disclosed Under 37 CFR 1.97 and 1.98.

The prior art relates to illumination devices including a backup power source that can be plugged into a light plug on a trailer to facilitate lights on the trailer to be illuminated. The prior art discloses an adapter plug for electrically coupling running lights on a vehicle to running lights of a trailer. The prior art discloses a universal wiring cord to facilitate electrical coupling between various types of trailer light plugs. The prior art discloses a universal power coupler for electrically coupling various electronic devices to trailer plugs on vehicles. The prior art discloses a portable inverter for converting direct current into alternating current.

BRIEF SUMMARY OF THE INVENTION

An embodiment of the disclosure meets the needs presented above by generally comprising a trailer that has a plurality of running lights disposed on the trailer. The trailer includes a power source is positioned in the trailer and a female light plug which can be electrically coupled to a male light plug on a towing vehicle. The female light plug is in communication with the plurality of running light. An adapter plug is pluggable into the female light plug when the female light plug is not electrically coupled to the male light plug on the towing vehicle. Additionally, the adapter plug places the power source on the trailer in electrical communication with the plurality of running lights on the trailer. In this way the running lights on the trailer can be powered by the power source on the trailer.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
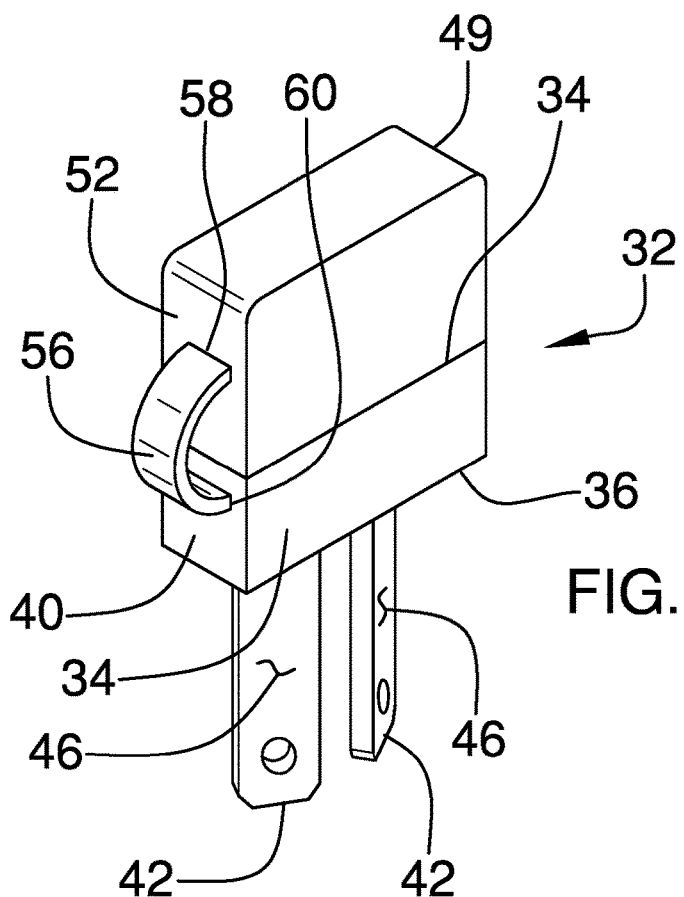
FIG. 1 is a perspective view of an adapter plug of an embodiment of the disclosure.
Figure 2:
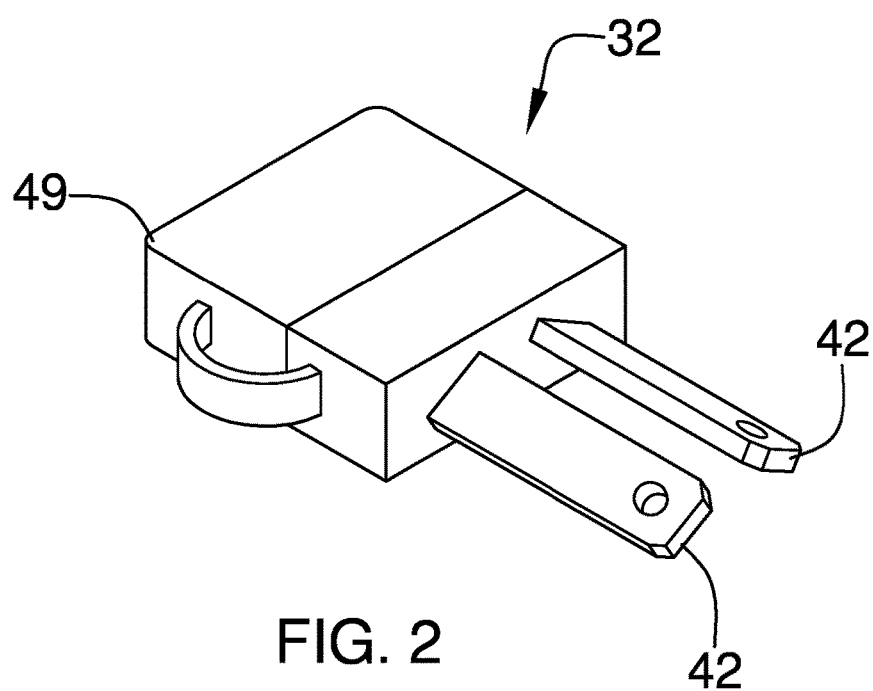
FIG. 2 is a top perspective view of an adapter plug of an embodiment of the disclosure.
Figure 3:
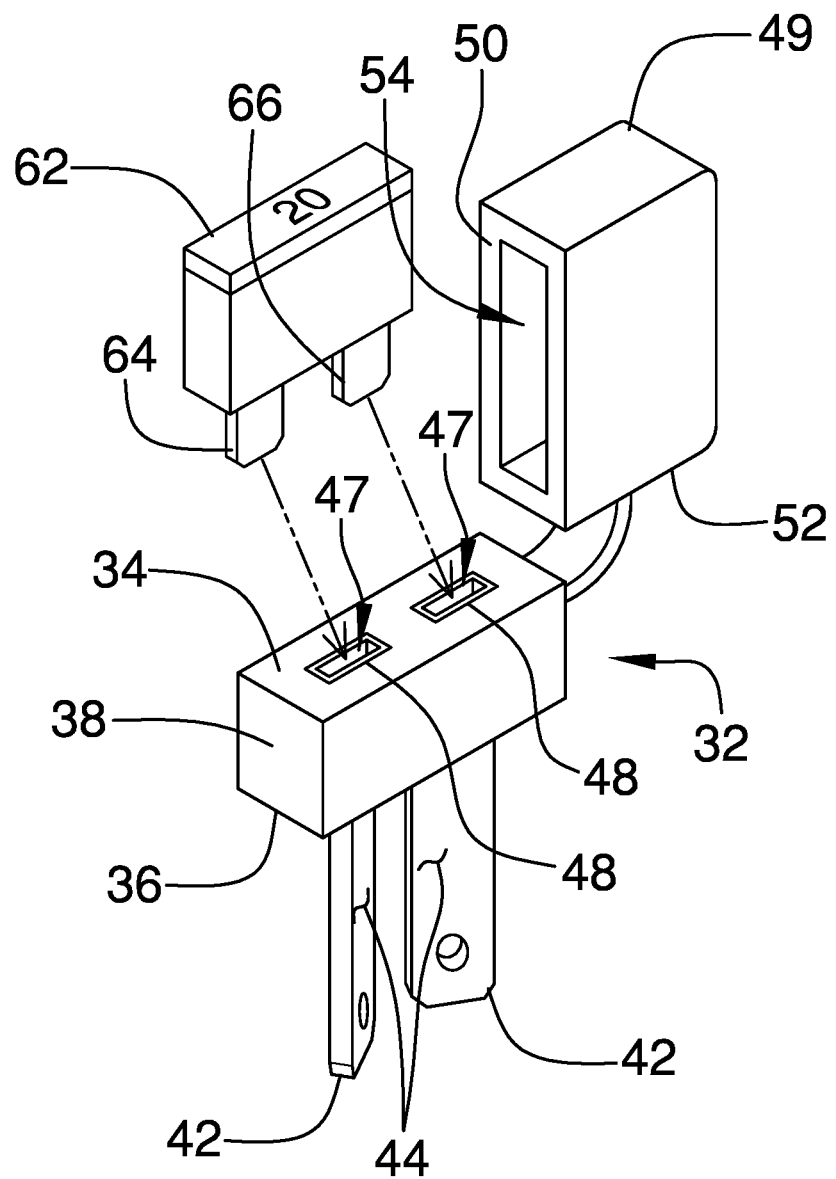
FIG. 3 is an exploded perspective view of an adapter plug of an embodiment of the disclosure.
Figure 6:
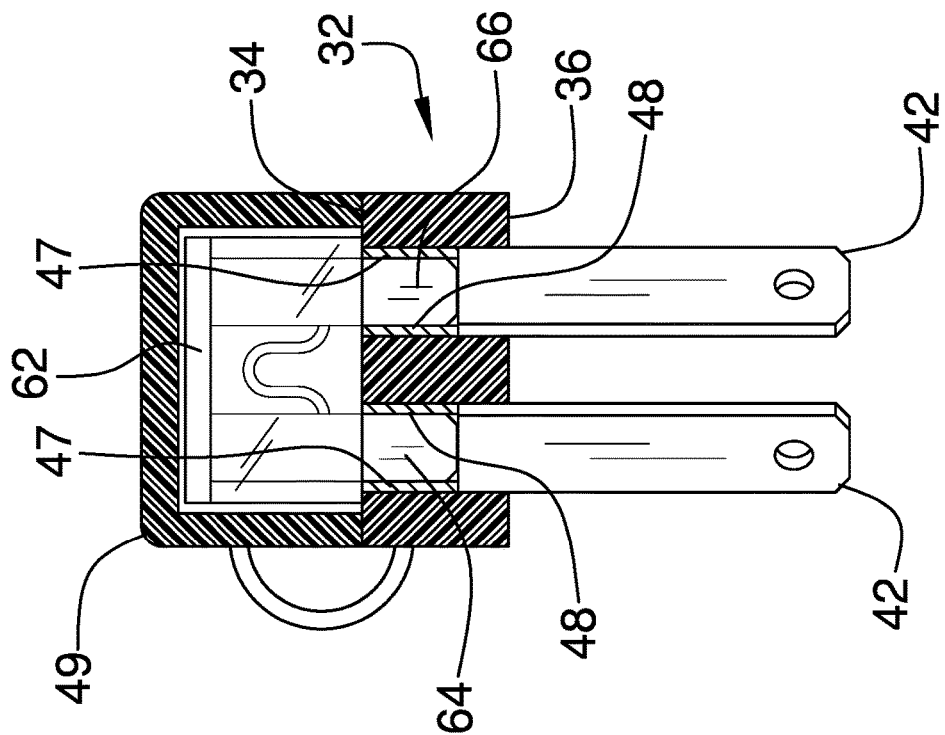
FIG. 6 is a front cut-away view of an embodiment of the disclosure.
Figure 4:
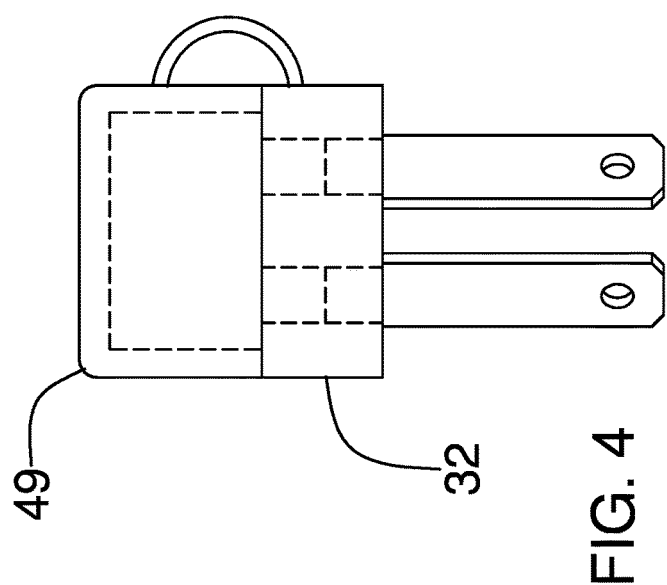
FIG. 4 is a front phantom view of an embodiment of the disclosure.
Figure 5:
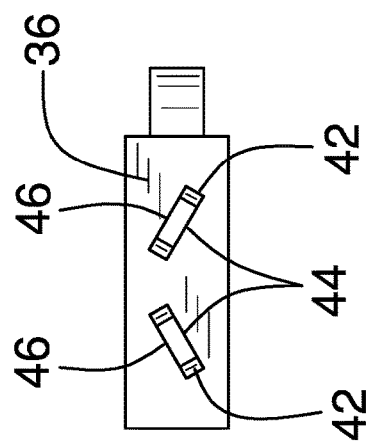
FIG. 5 is a bottom view of an embodiment of the disclosure.
Figure 7:
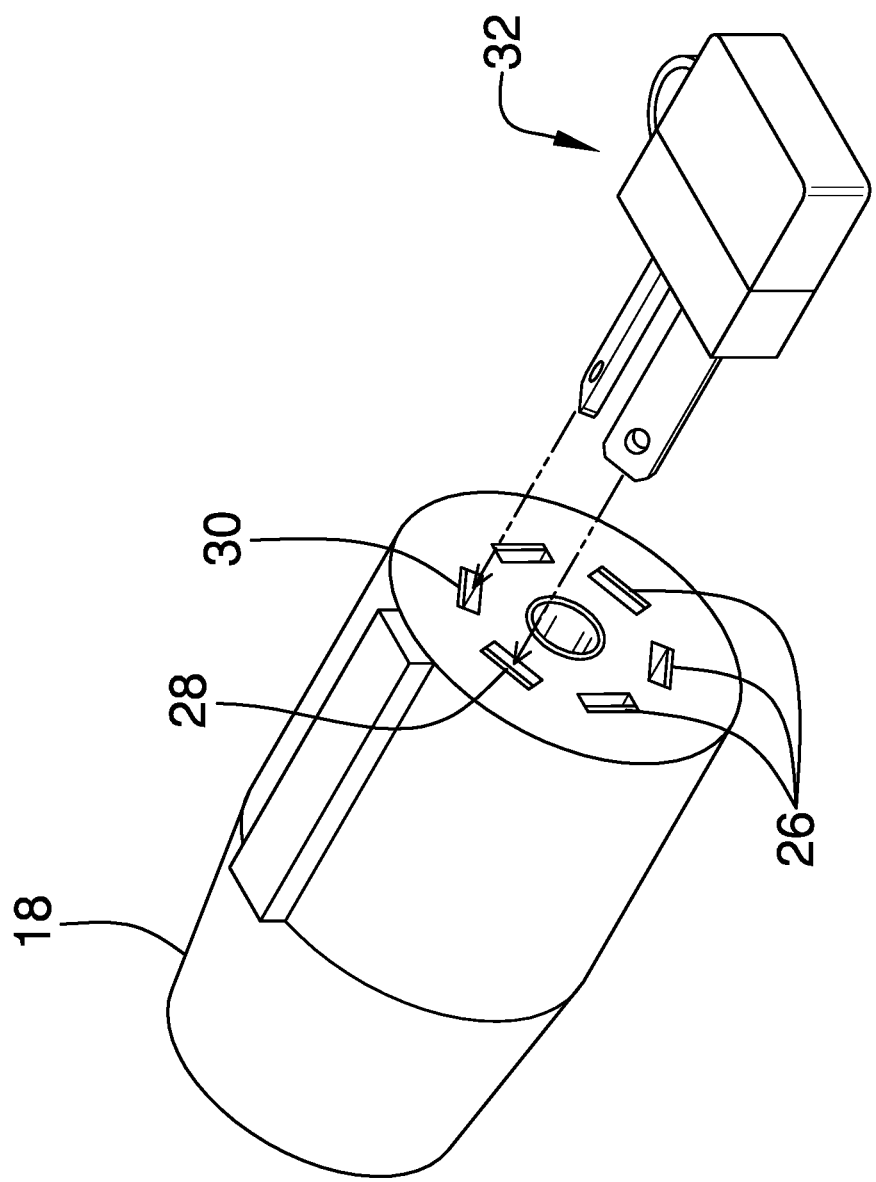
FIG. 7 is a perspective in-use view of an embodiment of the disclosure.
Figure 8:
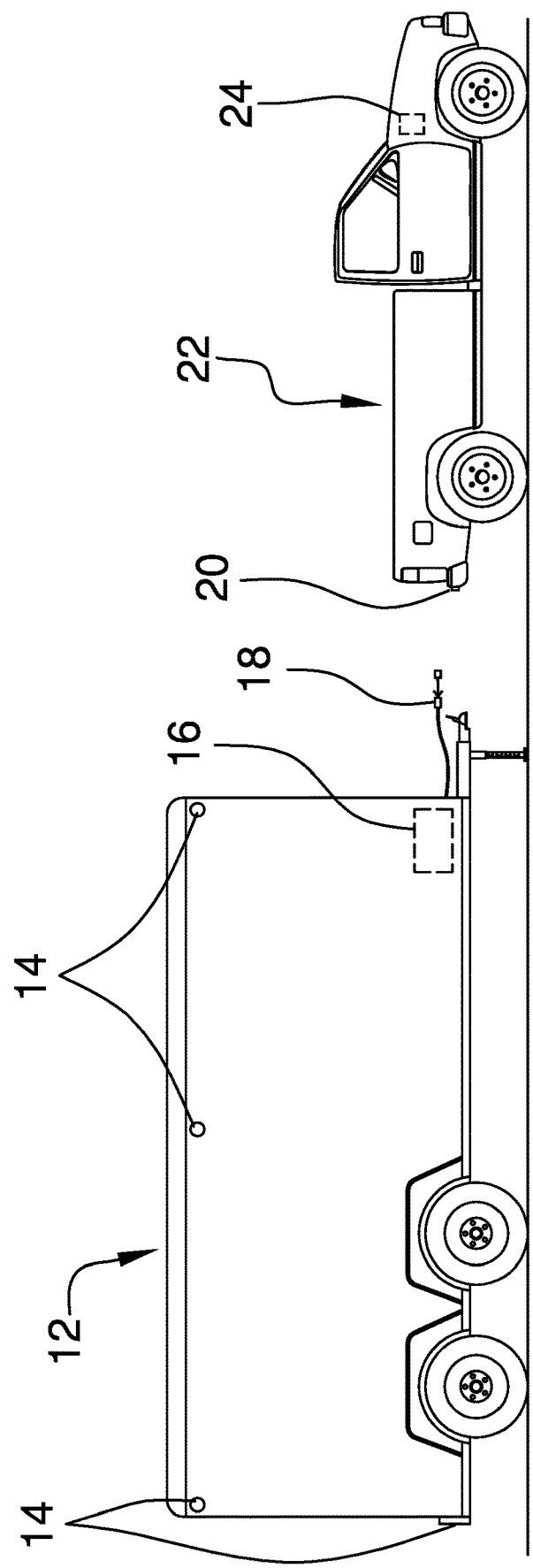
FIG. 8 is a perspective view of a trailer illumination assembly according to an embodiment of the disclosure.

With reference now to the drawings, and in particular to FIGS. 1 through 8 thereof, a new illumination device embodying the principles and concepts of an embodiment of the disclosure and generally designated by the reference numeral 10 will be described.

As best illustrated in FIGS. 1 through 8, the trailer illumination assembly 10 generally comprises a trailer 12 that has a plurality of running lights 14 that is disposed on the trailer 12. The running lights 14 are located to conform to state and federal traffic safety regulations and the trailer 12 includes a power source 16 that is positioned in the trailer 12. The trailer 12 includes a female light plug 18 that is disposed on the trailer 12 thereby facilitating the female light plug 18 to be electrically coupled to a male light plug 20 on a towing vehicle 22. The female light plug 18 is in communication with the plurality of running lights 14 thereby facilitating the running lights 14 to be powered by an electrical system 24 of the towing vehicle 22 when the female light plug 18 is electrically coupled to the male light plug 20 on the towing vehicle 22. The trailer 12 may be a tow behind camper or the like and the power source 16 in the trailer 12 may be a battery or other power source commonly employed in campers. Additionally, the towing vehicle 22 may be pickup truck, for example, or other motorized vehicle that is driven on public roadways and which is commonly employed to tow a trailer.

The female light plug 18 has a plurality of contacts 26 that is each recessed into the female light plug 18, and the plurality of contacts 26 includes a power contact 28 and a running light contact 30. The power contact 28 is electrically coupled to the power source 16 in the trailer 12 and the running light contact 30 is electrically coupled to the plurality of running lights 14 on the trailer 12. The female light plug 18 comprises a seven way trailer 12 plug that has flat terminals which are commonly employed on recreational vehicles and campers.

An adapter plug 32 is provided and the adapter plug 32 is pluggable into the female light plug 18 when the female light plug 18 is not electrically coupled to the male light plug 20 on the towing vehicle 22. The adapter plug 32 places the power source 16 on the trailer 12 in electrical communication with the plurality of running lights 14 on the trailer 12. In this way the running lights 14 on the trailer 12 can be powered by the power source 16 on the trailer 12. The adapter plug 32 has a top end 34, a bottom end 36 and an outer wall 38 extending between the top end 34 and the bottom end 36, and the outer wall 38 has a first lateral side 40. The adapter plug 32 has a pair of male contacts 42 each extending away from the bottom end 36, and each of the male contacts 42 has a first surface 44 and a second surface 46.

Each of the male contacts 42 is oriented on the bottom end 36 such that the first surface 44 of each of the male contacts 42 is angled toward each other and the second surface 46 of each of the male contacts 42 is angled away from each other. In this way the male contacts 42 can engage a respective one of the flat plugs on the seven way trailer plug. Each of the male contacts 42 is comprised of an electrically conductive material and each of the male contacts 42 engages a respective one of the power contact 28 and the running light contact 30 in the female light plug 18. The top end 34 has a pair of wells 47 each extending downwardly toward the bottom end 36 and each of the wells 47 is aligned with a respective one of the male contacts 42. The adapter plug 32 has a pair of fuse contacts 48 that is each positioned within a respective one of the wells 47. Each of the fuse contacts 48 is electrically coupled to a respective one of the male contacts 42 and each of the fuse contacts 48 is comprised of an electrically conductive material.

A lid 49 is movably attached to the adapter plug 32, the lid 49 has a bottom wall 50 and a first lateral wall 52, and the lid 49 has a fuse recess 54 extending inwardly on the bottom wall 50. A strap 56 is provided that has a first end 58 and a second end 60. The first end 58 is coupled to the first lateral wall 52 of the lid 49 and the second end 60 is coupled to the first lateral side 40 of the outer wall 38 of the adapter plug 32. The lid 49 may be comprised of a fluid impermeable material, including but not being limited to rubber or silicone.

A fuse 62 is provided that has a first contact 64 and a second contact 66, and each of the first contact 64 and the second contact 66 is insertable into a respective one of the wells 47 in the top end 34 of the adapter plug 32. Furthermore, each of the first contact 64 and the second contact 66 is comprised of an electrically conductive material. Each of the first contact 64 and the second contact 66 is placed in electrical communication with the fuse 62 contact in the respective well 44 when the first contact 64 and the second contact 66 are inserted into the wells 47. Each of the first contact 64 and the second contact 66 is in electrical communication with each other such that the fuse 62 completes a circuit between the power contact 28 and the running light contact 30 on the female light plug 18. The fuse 62 may comprise a 20.0 amp flat blade fuse or other similar type of fuse.

In use, the fuse 62 is plugged into the wells 47 in the adapter plug 32 and the lid 49 is positioned over the fuse 62 such that the fuse 62 is concealed in the fuse recess 54 in the lid 49. The adapter plug 32 is plugged into the female light plug 18 when the female light plug 18 is not electrically coupled to the male light plug 20 on the towing vehicle 22. Furthermore, the adapter plug 32 is plugged into the power contact 28 and the running light contact 30 on the female light plug 18. In this way the fuse 62 completes a circuit between the power source 16 on the trailer 12 and the running lights 14 on the trailer 12. In this way the running lights 14 can be illuminated when the trailer 12 is parked and is not attached to the towing vehicle 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A trailer illumination assembly for facilitating lights on a trailer to be illuminated with a battery on the trailer, said assembly comprising:
   a trailer having a plurality of running lights being disposed on said trailer, said trailer including a power source being positioned in said trailer, said trailer including a female light plug being disposed on said trailer thereby facilitating said female light plug to be electrically coupled to a male light plug on a towing vehicle, said female light plug being in communication with said plurality of running lights thereby facilitating said running lights to be powered by an electrical system of the towing vehicle when said female light plug is electrically coupled to the male light plug on the towing vehicle;
   an adapter plug being pluggable into said female light plug when said female light plug is not electrically coupled to the male light plug on the towing vehicle, said adapter plug placing said power source on said trailer in electrical communication with said plurality of running lights on said trailer thereby facilitating said running lights on said trailer to be powered by, said power source on said trailer;

wherein said adapter plug has a top end, a bottom end and an outer wall extending between said top end and said bottom end, said outer wall having a first lateral side; and wherein said adapter plug has a pair of male contacts each extending away from said bottom end, each of said male contacts having a first surface and a second surface, each of said male contacts being oriented on said bottom end such that said first surface of each of said male contacts is angled toward each other and said second surface of each of said male contacts is angled away from each other thereby facilitating said male contacts to engage a respective one of said flat plugs on said seven way trailer plug, each of said male contacts being comprised of an electrically conductive material.

2. The assembly according to claim 1, wherein:

said female light plug has a plurality of contacts each being recessed into said female light plug, said plurality of contacts including a power contact and a running light contact, said power contact being electrically coupled to said power source in said trailer, said running light contact being electrically coupled to said plurality of running lights on said trailer, said female light plug comprising a seven way trailer plug having flat terminals; and each of said male contacts engages a respective one of said power contact and said running light contact in said female light plug.

3. The assembly according to claim 1, wherein:

said top end has a pair of wells each extending downwardly toward said bottom end, each of said wells being aligned with a respective one of said male contacts; and said adapter plug has a pair of fuse contacts each being positioned within a respective one of said wells, each of said fuse contacts being electrically coupled to a respective one of said male contacts, each of said fuse contacts being comprised of an electrically conductive material.

4. The assembly according to claim 3, further comprising a fuse having a first contact and a second contact, each of said first contact and said second. contact being insertable into a respective one of said wells in said top end of said adapter plug, each of said first contact and said second contact being comprised of an electrically conductive material, each of said first contact and said second contact being placed in electrical communication with said fuse contact in said respective well when said first contact and said second contact are inserted into said wells.

5. The assembly according to claim 4, wherein:

said female light plug has a plurality of contacts each being recessed into said female light plug, said plurality of contacts including a power contact and a running light contact, said power contact being electrically coupled to said power source in said trailer, said running light contact being electrically coupled to said plurality of running lights on said trailer, said female light plug comprising a seven way trailer plug having flat terminals;

each of said male contacts engages a respective one of said power contact and said running light contact in said female light plug; and each of said first contact and said second contact is in electrical communication with each other such that said fuse completes a circuit between said power contact and said running light contact on said female light plug.

6. The assembly according to claim 1, further comprising:

a lid being movably attached to said adapter plug, said lid having a bottom wall and a first lateral wall, said lid having a fuse recess extending inwardly on said bottom wall; and a strap having a first end and a second end, said first end being coupled to said first lateral wall of said lid, said second end being coupled to said first lateral side of said outer wall of said adapter plug.

7. A trailer illumination assembly for facilitating lights on a trailer to be illuminated with a battery on the trailer, said assembly comprising:

a trailer having a plurality of running lights being disposed on said trailer, said trailer including a power source being positioned in said trailer, said trailer including a female light plug being disposed on said trailer thereby facilitating said female light plug to be electrically coupled to a male light plug on a towing vehicle, said female light plug being in communication with said plurality of running lights thereby facilitating said running lights to be powered by an electrical system of the towing vehicle when said female light plug is electrically coupled to the male light plug on the towing vehicle, said female light plug having a plurality of contacts each being recessed into said female light plug, said plurality of contacts including a power contact and a running light contact, said power contact being electrically coupled to said power source in said trailer, said running light contact being electrically coupled to said plurality of running lights on said trailer, said female light plug comprising a seven way trailer plug having flat terminals;

an adapter plug being pluggable into said female light plug when said female light plug is not electrically coupled to the male light plug on the towing vehicle, said adapter plug placing said power source on said trailer in electrical communication with said plurality of running lights on said trailer thereby facilitating said running lights on said trailer to be powered by said power source on said trailer, said adapter plug having a top end, a bottom end and an outer wall extending between said top end and said bottom end, said outer wall having a first lateral side, said adapter plug having a pair of male contacts each extending away from said bottom end, each of said male contacts having a first surface and a second surface, each of said male contacts being oriented on said bottom end such that said first surface of each of said male contacts is angled toward each other and said second surface of each of said male contacts is angled away from each other thereby facilitating said male contacts to engage a respective one of said flat plugs on said seven way trailer plug, each of said male contacts being comprised of an electrically conductive material, each of said male contacts engaging a respective one of said power contact and said running light contact in said female light plug, said top end having a pair of wells each extending downwardly toward said bottom end, each of said wells being aligned with a respective one of said male contacts, said adapter plug having a pair of fuse contacts each being positioned within a respective one of said wells, each of said fuse contacts being electrically coupled to a respective one of said male contacts, each of said fuse contacts being comprised of an electrically conductive material;

a lid being movably attached to said adapter plug, said lid having a bottom wall and a first lateral wall, said lid having a fuse recess extending inwardly on said bottom wall;

a strap having a first end and a second end, said first end being coupled to said first lateral wall of said lid, said second end being coupled to said first lateral side of said outer wall of said adapter plug; and a fuse having a first contact and a second contact, each of said first contact and said second contact being insertable into a respective one of said wells in said top end of said adapter plug, each of said first contact and said second contact being comprised of an electrically conductive material, each of said first contact and said second contact being placed in electrical communication with said fuse contact in said respective well when said first contact and said second contact are inserted into said wells, each of said first contact and said second contact being in electrical communication with each other such that said fuse completes a circuit between said power contact and said running light contact on said female light plug.

* * * * *